(12) United States Patent
Kayano et al.

(10) Patent No.: US 6,889,570 B2
(45) Date of Patent: May 10, 2005

(54) GEAR-TYPE AUTOMATIC TRANSMISSION AND AN AUTOMOBILE USING THE GEAR-TYPE AUTOMATIC TRANSMISSION

(75) Inventors: Mitsuo Kayano, Hitachi (JP); Toshimichi Minowa, Mito (JP); Hiroshi Sakamoto, Hitachi (JP); Tatsuya Ochi, Hitachi (JP); Hiroshi Ohnishi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/721,460

(22) Filed: Nov. 26, 2003

(65) Prior Publication Data

US 2004/0116249 A1 Jun. 17, 2004

Related U.S. Application Data

(63) Continuation of application No. 09/857,450, filed as application No. PCT/JP99/06799 on Dec. 3, 1999, now Pat. No. 6,679,133.

(30) Foreign Application Priority Data

Dec. 3, 1998 (JP) .......................................... 10-343834

(51) Int. Cl.[7] .................................................. F16H 3/38
(52) U.S. Cl. ........................................ 74/339; 477/109
(58) Field of Search ............................. 74/339; 477/109

(56) References Cited

U.S. PATENT DOCUMENTS

| 4,454,057 A | 6/1984 | Kaneko et al. ............ 252/299.1 |
| 4,616,521 A | 10/1986 | Akashi et al. ................. 74/335 |
| 4,627,312 A | 12/1986 | Fujieda et al. ................. 74/866 |
| 4,860,607 A | 8/1989 | Numazawa et al. ........... 74/330 |
| 5,313,856 A | 5/1994 | Schneider et al. ............. 477/80 |
| 6,679,133 B1 * | 1/2004 | Kayano et al. ................ 74/335 |

FOREIGN PATENT DOCUMENTS

| EP | 0 088 486 A | 9/1983 |
| EP | 0 173 117 A | 12/1986 |
| GB | 2 117 068 A | 10/1983 |
| GB | 2 117 462 A | 10/1983 |
| JP | 58-149449 A | 9/1983 |
| JP | 58-193951 A | 10/1985 |
| JP | 59-187817 | 1/1986 |
| JP | 61-103056 A | 5/1986 |
| JP | 61-45163 A | 12/1986 |
| JP | 63-2736 A | 1/1988 |
| JP | 2-176261 | 7/1990 |
| JP | 7-119819 A | 5/1995 |

OTHER PUBLICATIONS

International Search Report for PCT/JP99/06799.

* cited by examiner

*Primary Examiner*—Dirk Wright
(74) *Attorney, Agent, or Firm*—Crowell & Moring LLP

(57) ABSTRACT

A vehicle transmission system has a gear-type transmission with a plurality of gears and a plurality of claw clutches which transmits a torque between an input shaft of said gear-type transmission and an output shaft of said gear-type transmission. The transmission changes transmission courses by engaging with and/or disengaging from the gears and the claw clutches, and forms another transmission course via a torque controller between the input shaft of the gear-type transmission and the output shaft of said gear-type transmission during a period between a first transmission course and a second transmission course formed by the gears and the claw clutches. A torque capacity of the torque controller is greater than the maximum output shaft torque of the transmission.

6 Claims, 13 Drawing Sheets

FIG. 9
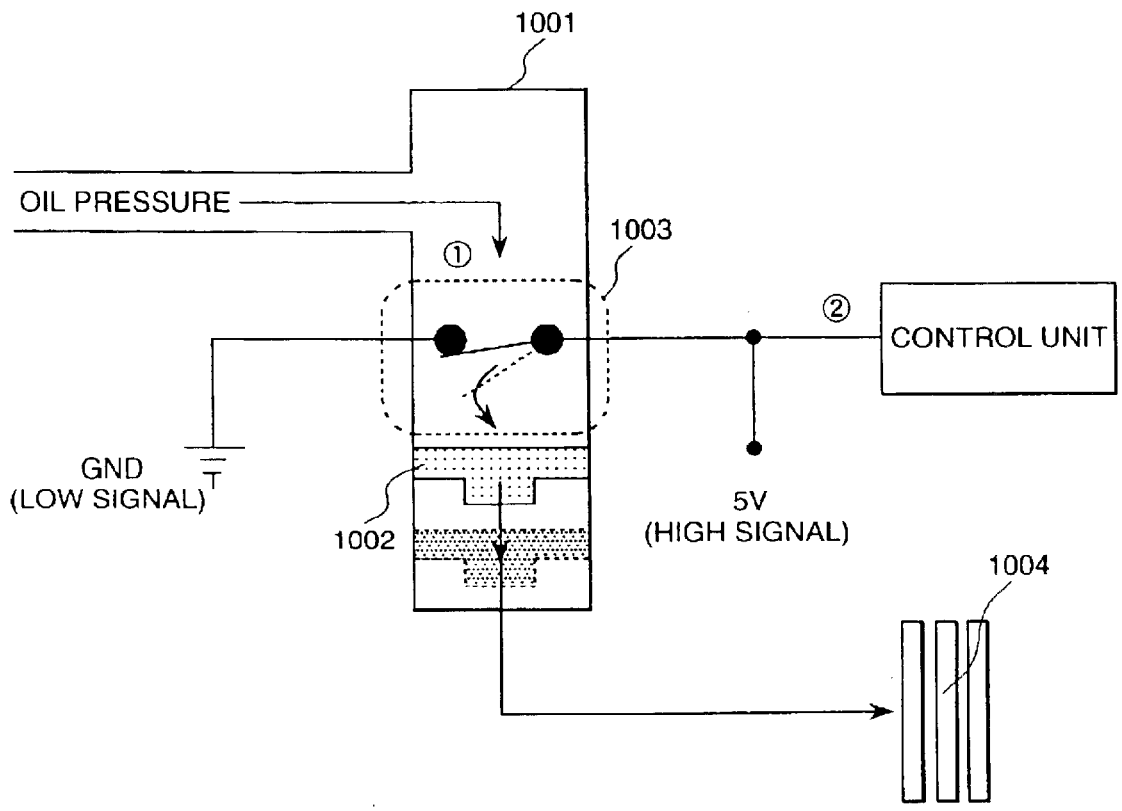
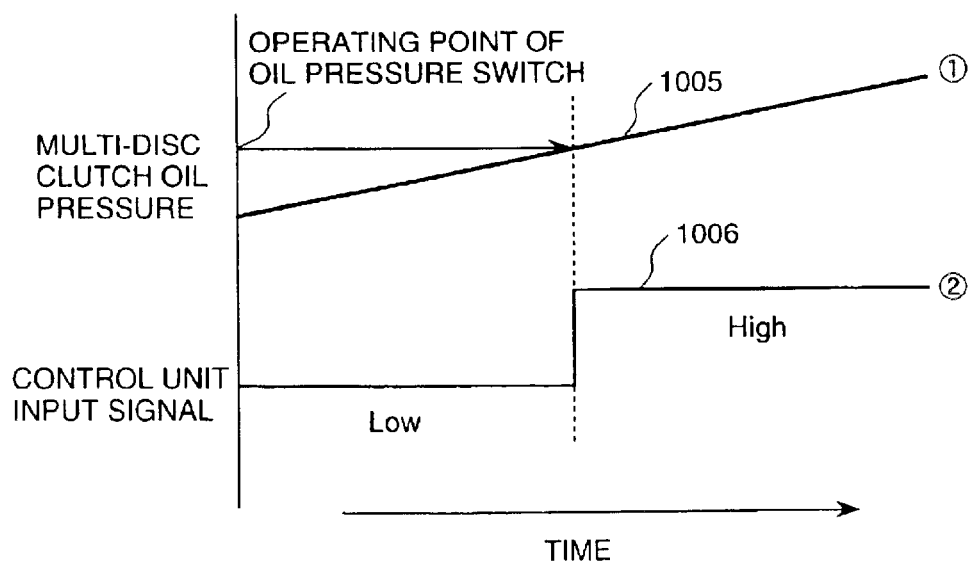

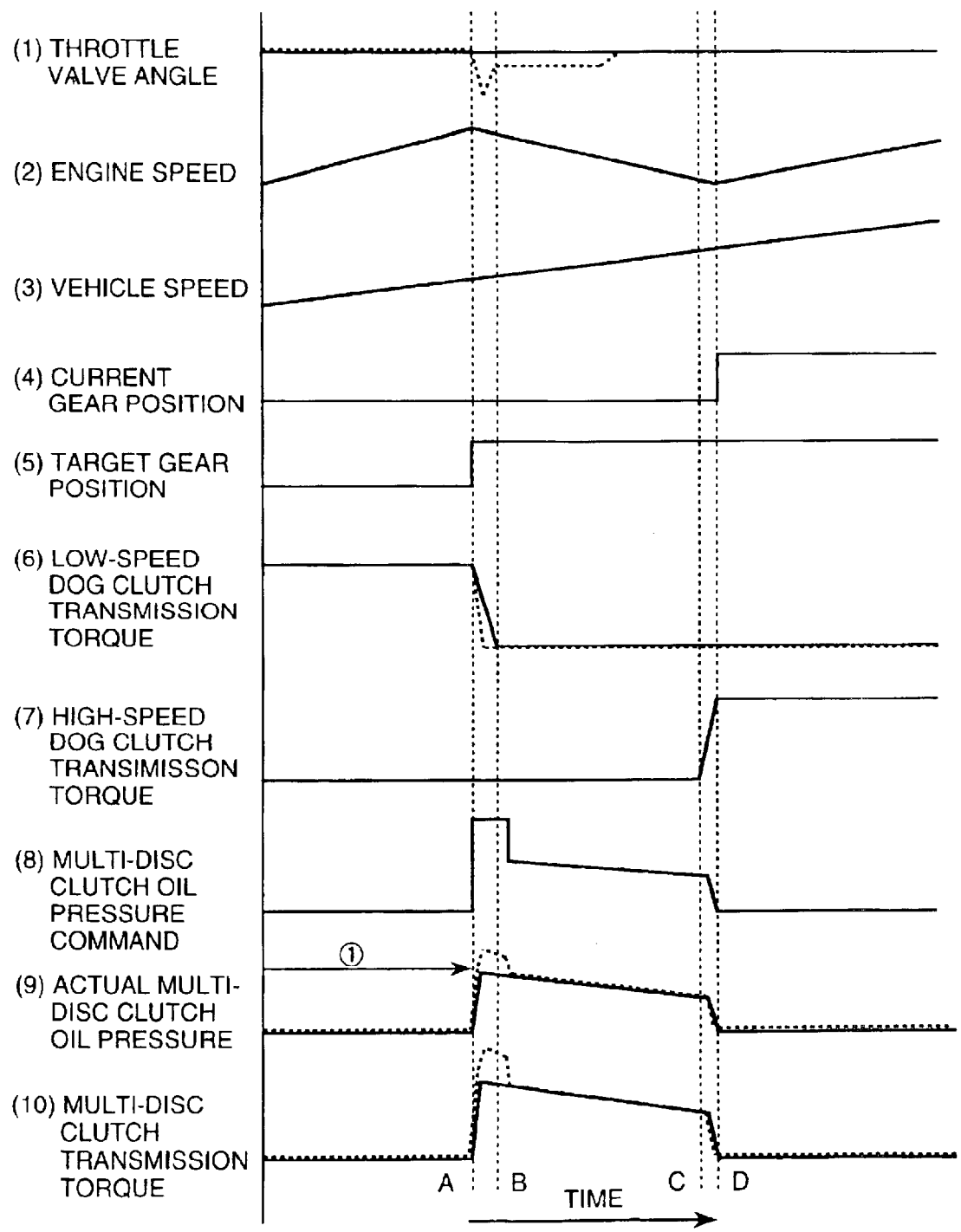

FIG. 12
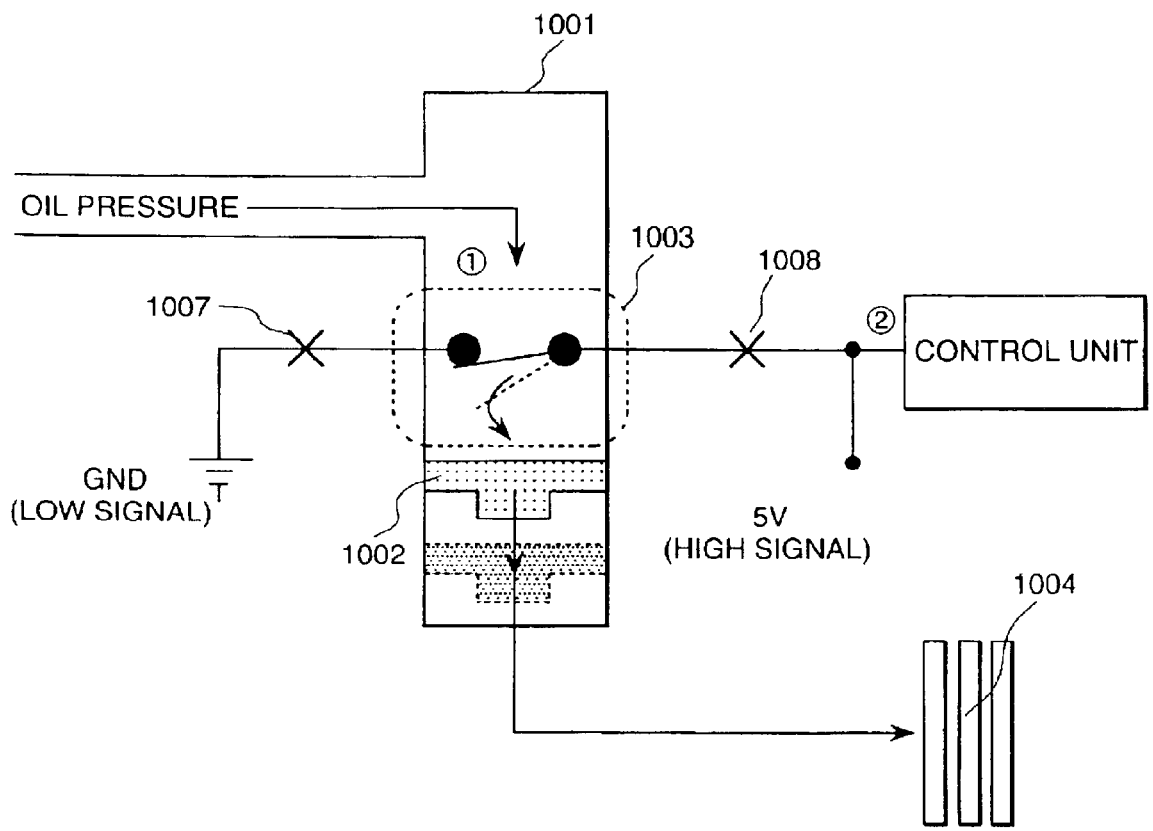
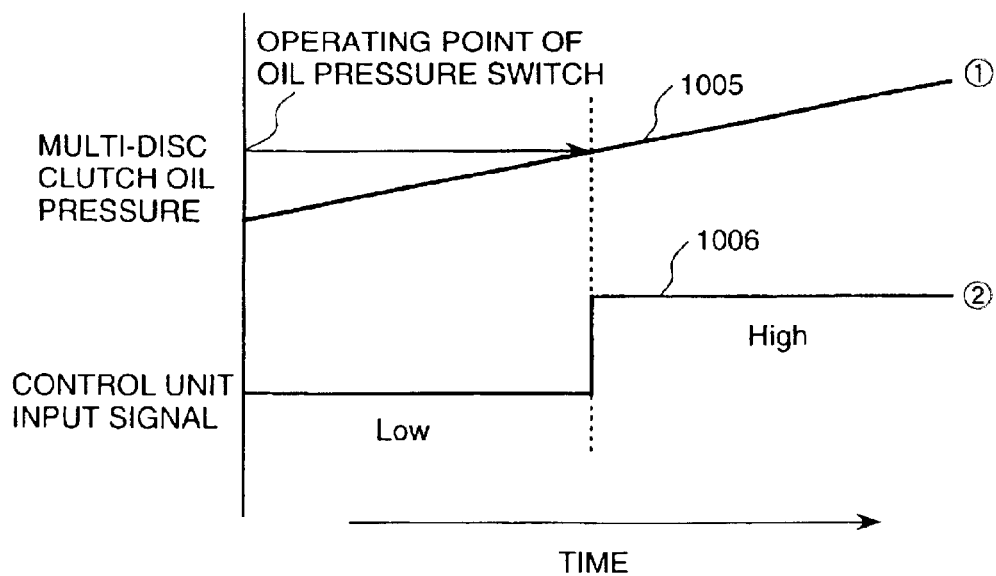

US 6,889,570 B2

GEAR-TYPE AUTOMATIC TRANSMISSION AND AN AUTOMOBILE USING THE GEAR-TYPE AUTOMATIC TRANSMISSION

This application is a continuation of application Ser. No. 09/857,450, filed Jun. 4, 2001, now U.S. Pat. No. 6,679,133, which is a 371 of PCT/JP99/06799, filed Dec. 3, 1999.

TECHNICAL FIELD

The present invention relates to an automatic transmission using a gear-type shifting means, and to an automobile using the gear-type automatic transmission.

BACKGROUND TECHNIQUE

Prior inventions relating to an automatic transmission using a gear-type shifting means include one in which the top-speed gear of the gear-type automatic transmission is engaged/disengaged using a multi-disc clutch and when a shift is performed, the engine speed of the corresponding vehicle is controlled by slipping the multi-disc clutch and is thus synchronized with the rotational speed of the output shaft so as to accomplish the shift smoothly. Such prior art is disclosed in, for example, Japanese Laid-Open Patent Application Publication No. Sho 61-45163.

The gear-type automatic transmission described above, however, poses the problems that if the torque capacity of the multi-disc clutch is small, when a shift is made at a high output shaft torque, the difference between this torque and the torque that the multi-disc clutch can generate will be transmitted to the output shaft as a change in torque, thus making the passengers (including the driver) feel uncomfortable, and that in case of trouble with the driving source of the actuators which drive the automatic transmission, if the engine torque is not transmitted to the output shaft properly, this can cause the engine to stall or the engine speed to increase abruptly, thus resulting in the vehicle not operating properly.

DISCLOSURE OF THE INVENTION

The present invention provides: a gear-type automatic transmission that enables smooth shifts to be performed by varying the output shaft torque of the automatic transmission smoothly, even when the output shaft torque is high, and the corresponding vehicle to run properly, even if any trouble occurs in the driving source of the actuators which drive the automatic transmission; and an automobile that uses the gear-type automatic transmission.

The present invention relates to a gear-type automatic transmission having a plurality of gear trains between its input shaft and output shaft and capable of changing the revolutions of said input shaft and output shaft by repeating selective and automatic engagement and disengagement of said gear trains, wherein the gear-type automatic transmission further has a clutch that temporarily transmits the torque of the input shaft and output shaft when shifting one of the gear trains to another gear train.

BRIEF DESCRIPTION OF THE DRAWINGS

FIG. 9 shows the hydraulic section of an automobile power transmission system which forms an embodiment of the present invention.

FIG. 10 shows time-varying changes in the characteristics of an automobile power transmission system which forms another embodiment of the present invention.

FIG. 12 shows the hydraulic section of an automobile power transmission system which forms another embodiment of the present invention.

PREFERRED EMBODIMENTS FOR CARRYING OUT THE INVENTION

Figure 1:
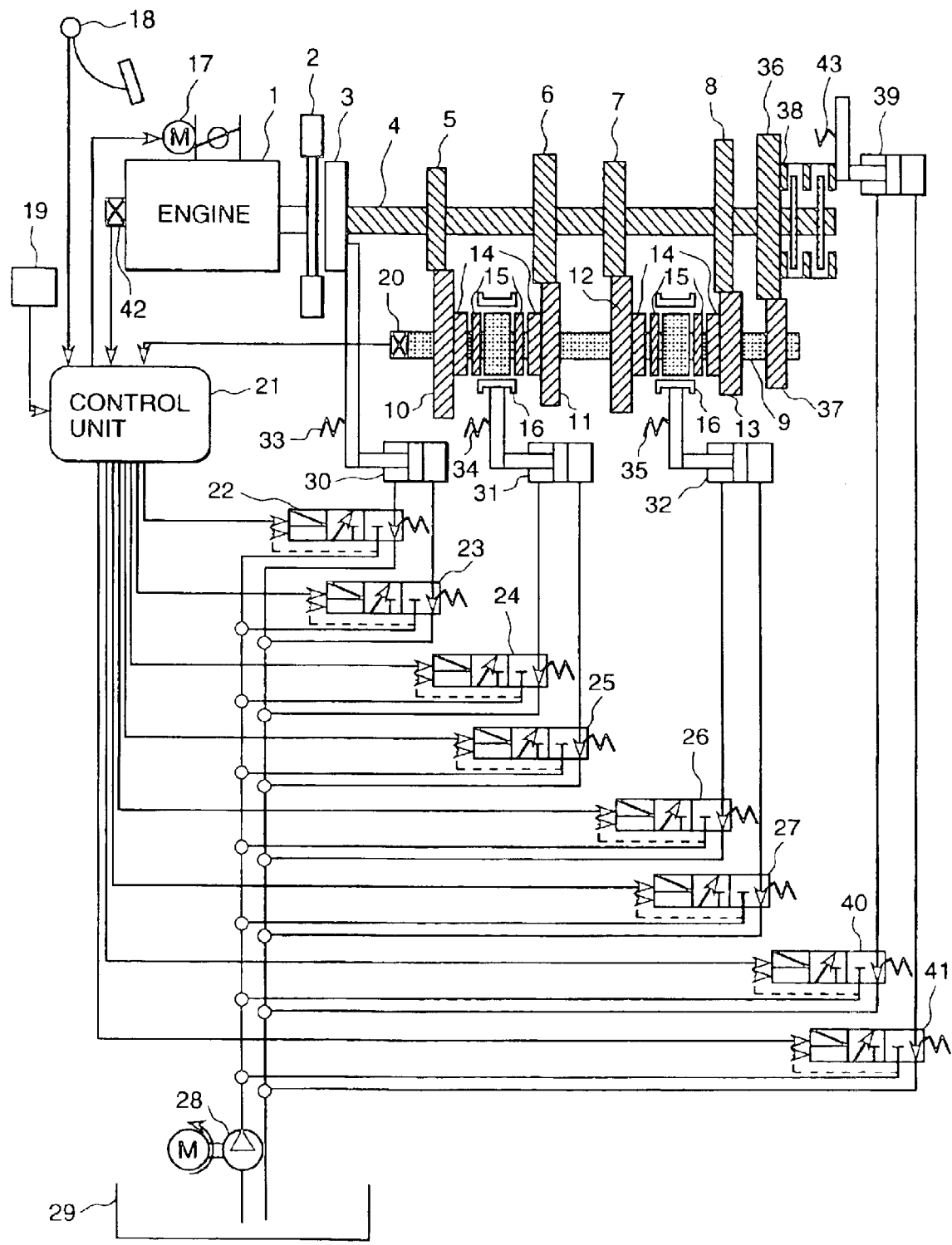
FIG. 1 shows the total configuration of an automobile power transmission system which forms an embodiment of the present invention.

An embodiment of the present invention is shown in FIG. 1, which is a total block diagram of an automobile power transmission system with an actuator-driven automatic gear-type transmission whose input shaft has a means for connecting a fifth-speed gear train to the output shaft of the transmission via a wet multi-disc clutch. Engine 1 is provided with electronically controlled throttle 17 for adjusting the engine torque, and with engine speed sensor 42 for detecting the engine speed. The engine torque is first transmitted to the input shaft 4 of the gear-type transmission via flywheel 2 and starting clutch 3, then transmitted to output shaft 9 via either gear 5, 6, 7, 8, 10, 11, 12, or 13, and finally, transmitted to tires to operate the automobile. The starting clutch 3 for transmitting the engine torque to the input shaft 4 of the gear-type transmission is engaged/disengaged by actuator 30 and controls the transmission ratio of the engine torque. When a shift is performed, either gear 10, 11, 12, or 13, all of which can be rotated with respect to output shaft 9, is selected by moving the sleeve 16 of a claw clutch (for example, a dog clutch) and then engaging clutch hub 44 and gear spline 14. One gear is always engaged by the dog clutch, and all other gears are disengaged. Wet multi-disc clutch 38 is also disengaged, except during shifting and during driving with the shift lever placed in the fifth gear. During shifting, the torque to be transmitted is controllable by fully engaging the wet multi-disc clutch 38 or engaging the clutch halfway so as to prevent the engine speed from decreasing or increasing abruptly during the shift. This wet multi-disc clutch is driven by actuator 39, and solenoid-operated selector valves 40 and 41 for controlling the oil pressure within actuator 39 are controlled by a control unit 21. Actuators 30, 31, 32, and 39 are driven by oil pressure. The oil, after being increased in pressure by pump 28, is sent from tank 29 to the actuators via solenoid valves 22, 23, 24, 25, 26, and 27. Reduction in the internal oil pressure of the actuators is accomplished by connecting these actuators to the draining side via solenoid valves 22, 23, 24, 25, 26, and 27. These solenoid valves 22, 23, 24, 25, 26, and 27 are controlled by control unit 21, which receives signals from the various sensors of the automobile, such as accelerator pedal sensor 18 for detecting the position of the accelerator pedal of the automobile, inhibitor switch 19 for detecting the position of the shift lever, engine speed sensor 42 for detecting the engine speed, and output shaft speed sensor 20 for detecting the rotational speed of the output shaft. The operational status of the automobile is judged from these signals, and the starting clutch status and the gear position are optimized. During shifting, electronically controlled throttle 17 is also controlled to prevent the engine speed from increasing abruptly. The transmission having such configuration as described above is disclosed in Japanese Laid-Open Patent Application Publication No. Sho 61-45163. This configuration, however, has the problem that if the torque capacity of the multi-disc clutch is small, when a shift is made at a high output shaft torque, the difference between this torque and the torque that the multi-disc clutch can generate will be transmitted to the output shaft as a change in torque, thus making the passengers (including the driver) feel uncomfortable. In the present invention, therefore, the torque of the multi-disc clutch is generated by increasing its torque capacity to a value above the maximum output shaft torque of the transmission to ensure that a constant output shaft torque is maintained during shifting.

Figure 2:
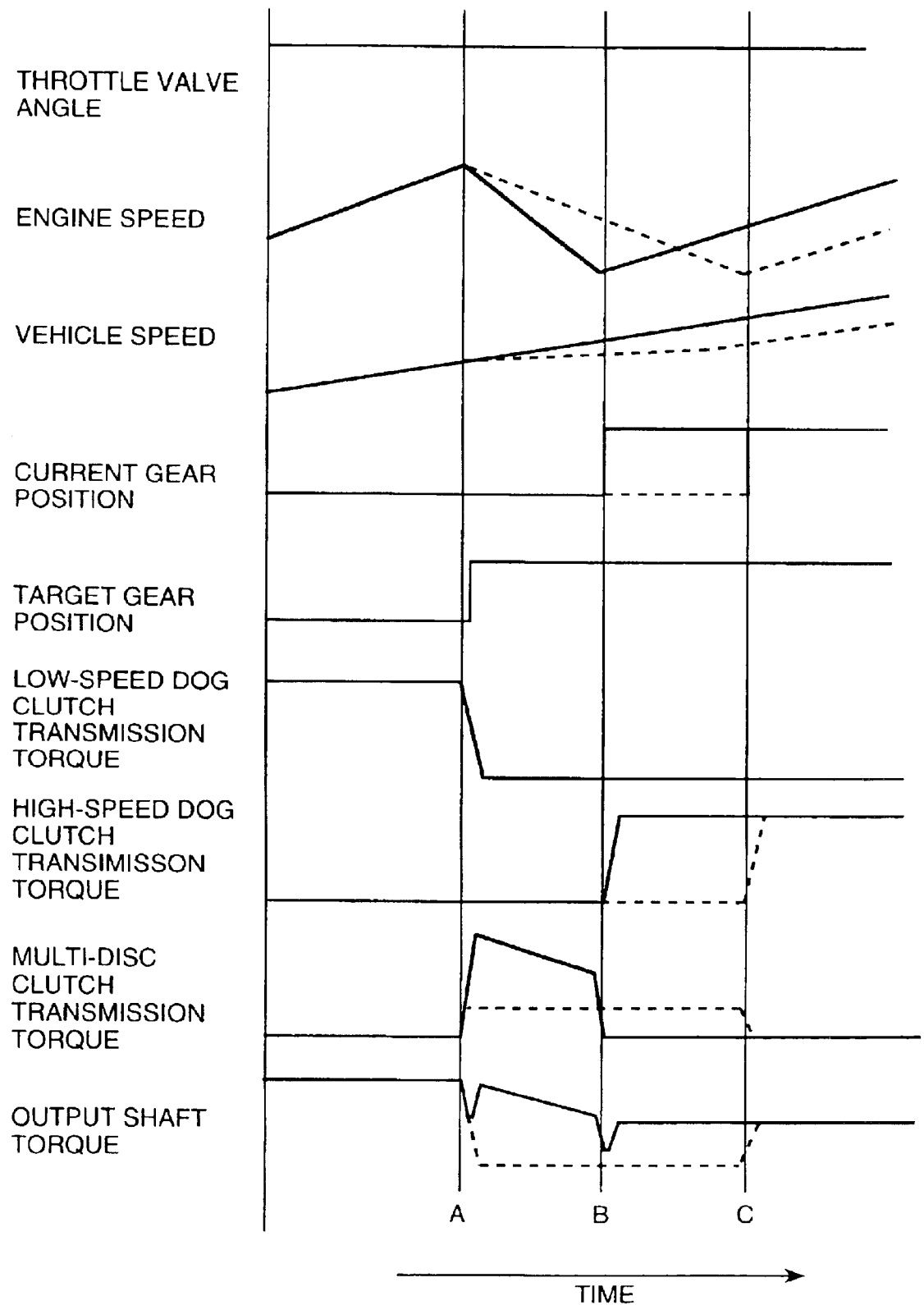
FIG. 2 shows a timing chart of the up-shift in FIG. 1.

A timing chart of up-shift is shown as FIG. 2, in which the solid line denotes the case that the torque capacity of the multi-disc clutch is greater than the maximum output shaft torque of the transmission, and the short dashed line denotes the case that the torque capacity of the multi-disc clutch is smaller than the maximum output shaft torque. The engine speed and the vehicle speed increase at a fixed throttle valve angle, and when predetermined shifting conditions are satisfied, the target gear position is changed at time A to initiate the shift. During the shift, the dog clutch at the low-speed gear side is disengaged first. At this time, the plunging load on the multi-disc clutch is increased. This plunging load is controlled to ensure that the output torque generated before the shift is performed will change smoothly to the output torque generated after the shift. After the engine speed has synchronized at time B, the dog clutch at the high-speed gear side is engaged and the multi-disc clutch is disengaged. This completes the gear shift. If, however, the torque capacity of the multi-disc clutch is smaller than the maximum output shaft torque, since the torque transmitted has its limits, the disengagement of the dog clutch at the low-speed gear side abruptly reduces the output shaft torque during the interval from time A to time C, thus increasing the vehicle speed too slowly and powering down the engine to make the passengers feel uncomfortable. Also, the synchronization of the engine speed is delayed and the shifting time interval is prolonged to time C. In the present invention, therefore, the torque of the multi-disc clutch is generated by increasing its torque capacity to a value above the maximum output shaft torque of the transmission to ensure that a constant output shaft torque is maintained during shifting.

The multi-disc clutch to be mounted in the transmission is designed so that when the actual setting of the clutch capacity of the multi-disc clutch is taken as T and the maximum output shaft torque of the transmission is taken as Tth, the value of T/Tth usually stays within the range from 1.1 to 1.8. The torque capacity of the multi-disc clutch can be calculated using expression (1) below.

$$T = n \cdot \mu \cdot rm \cdot P \tag{1}$$

T: Torque capacity
n: Number of friction surfaces
$\mu$: Coefficient of friction
rm: Mean-effective radius
P: Plunging load The coefficient of friction, $\mu$, in the above expression depends on the type of material used for the friction plate, the type of oil, the surface pressure, the specified temperature, and other factors. Usually, however, $\mu$ takes a value from 0.1 to 0.2. It can be seen from expression (1) that the torque capacity can be increased by increasing either the number of friction surfaces, n, or the mean effective radius, rm, namely, the area of the clutch disc.

Also, the maximum output shaft torque of the transmission can be calculated using expression (2) below.

$$Tth = Temax \cdot rgpl \tag{2}$$

Tth: Maximum output shaft torque
Temax: Maximum engine torque
rgpl: Maximum reduction gear ratio The maximum reduction gear ratio refers to a value at which the gear ratio between the input shaft and output shaft of the transmission becomes a maximum, and usually takes a value from 3.5 to 4.2. In FIG. 1, the maximum reduction gear ratio can be calculated as the [Number of teeth on the first driven gear 10]/[Number of teeth on the first driving gear 5]. More specifically, this value is, for example, 3.545 for the first gear speed, 2.111 for the second gear speed, 1.448 for the third gear speed, 1.088 for the fourth gear speed, or 0.825 for the fifth gear speed.

Figure 3:
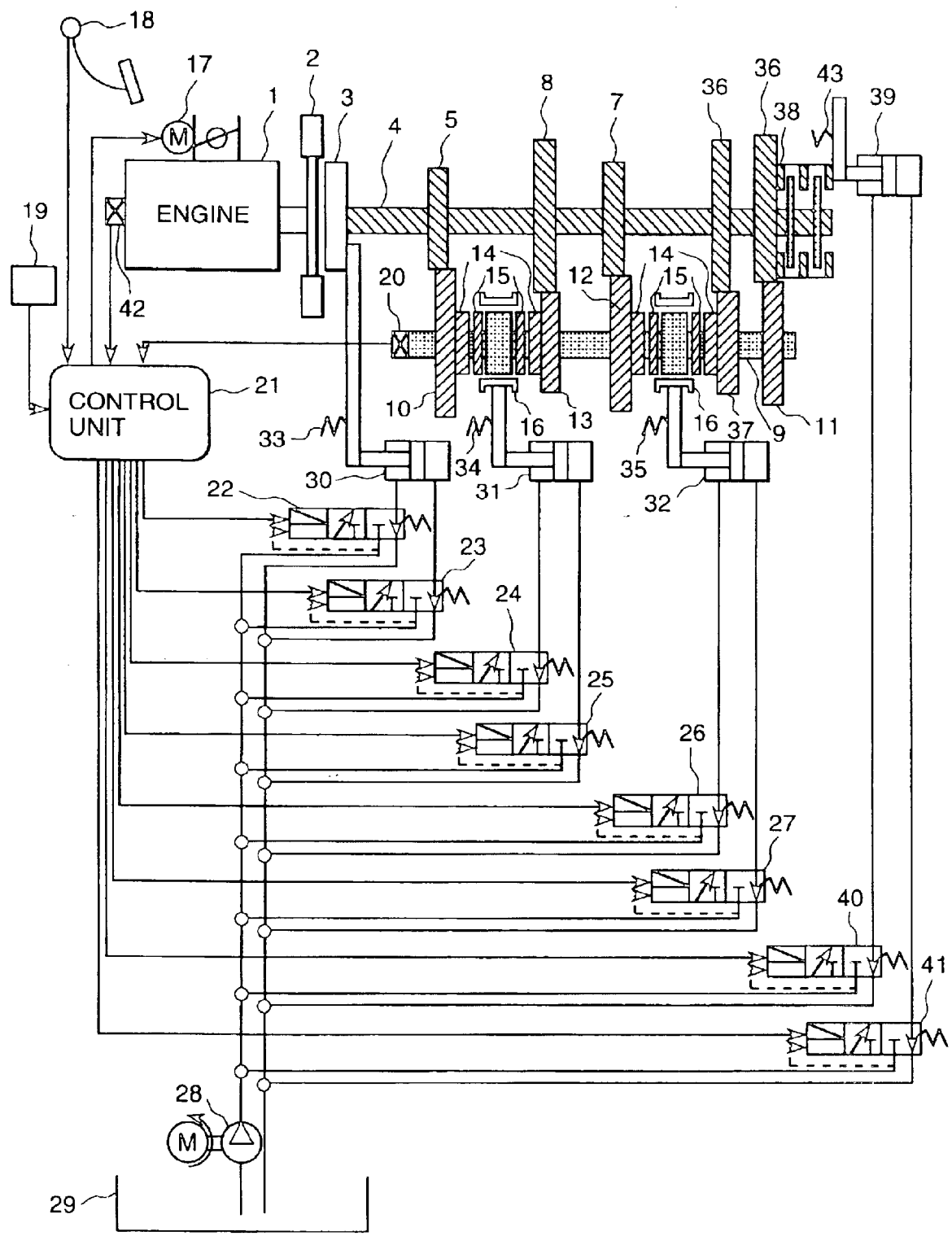
FIG. 3 shows the total configuration of an automobile power transmission system which forms another embodiment of the present invention.

Another embodiment of the invention is shown in FIG. 3, which is a total block diagram of an automobile power transmission system with an actuator-driven automatic gear-type transmission whose input shaft has a means for connecting a third-speed gear train to the output shaft of the transmission via a wet multi-disc clutch. This transmission system, although the same as that of FIG. 1 in terms of basic construction, has a means for connecting gear 6 (in this embodiment, a third-speed gear) of a middle gear ratio to input shaft 4 via wet multi-disc clutch 38. Wet multi-disc clutch 38 is disengaged, except during shifting and during driving with the shift lever placed in the third gear. During shifting, the torque to be transmitted is controllable by fully engaging the wet multi-disc clutch 38 or engaging the clutch halfway so as to prevent the engine speed from decreasing or increasing abruptly during the shift. This wet multi-disc clutch is driven by actuator 39, and solenoid-operated selector valves 40 and 41 for controlling the oil pressure within actuator 39 are controlled by a control unit 21. In this power transmission system, if any trouble occurs in pump 28 and the oil pressure does not increase as a result, the actuator will not operate and the automobile will be unable to run. For this reason, the transmission system is provided with mechanical means 33, 34, 35, and 43, by which, even in case of trouble with pump 28 and the resulting failure to increase the oil pressure, the starting clutch 3 is disengaged, the target gear is placed in neutral position, and wet multi-disc clutch 38 is engaged halfway. Although mechanical means that use return springs are employed as the mechanical means in this embodiment, these means can also use the balancing force of an oil pressure, instead. Or sleeve 16 can also be actuated using a motor electrically driven by the actuator. Doing so enables the automobile to run without engine 1 stalling or abruptly revolving at too high a speed, even if the pump fails. For reduction gear ratios of 3.545 for the first gear speed, 2.111 for the second gear speed, 1.448 for the third gear speed, 1.088 for the fourth gear speed, and 0.825 for the fifth gear speed, if a multi-disc clutch is connected to the fifth-speed gear having a reduction gear ratio smaller than 1, this clutch must be engaged halfway before the automobile can be started in case of trouble. Although the automobile can be started gently on downslopes or flats, engine 1 will stall if starting the vehicle on upslopes or starting it quickly is attempted. It is desirable, therefore, that the multi-disc clutch be provided at a shifting stage greater than 1 in terms of reduction gear ratio.

Also, even if such trouble occurs in the hydraulic system, the fail-safe means of said wet multi-disc clutch 38 enables the use of a limp-home function (self-running). However, since the engaging force of said wet multi-disc clutch 38 is constant, the engaging force cannot be changed according to the particular torque of the engine. If the driver steps on the accelerator pedal under such a status, therefore, said wet multi-disc clutch 38 may undergo unusual wear due to overloading. Consequently, it is necessary to detect such hydraulic system trouble in said control unit 21. At this time, it is also necessary that if the stepping-on stroke of the accelerator pedal is less than the required value, the valve angle of said electronically controlled throttle 17 should be adapted to the accelerating operations of the driver, or that if the stepping-on stroke of the accelerator pedal is greater than the required value, the valve angle of said electronically controlled throttle 17 should be fixed instead of the throttle valve angle being adapted to the accelerating operations of the driver.

More specifically, this required throttle valve angle is an angle at which the engine speed increases above the idling speed, and said control unit 21 provides control in order for this angle to be achieved. In addition, the engaging force required for said wet multi-disc clutch 38 to be halfway engaged is set to the required value at which a driving torque enabling the start of the vehicle can be obtained, by means of the engine torque generated at the required valve angle of said electronically controlled throttle 17. A similar fail-safe function can also be implemented by directly connecting the said wet multi-disc clutch 38 and setting said starting clutch 3 to a halfway engaged status so as to obtain the required engaging force mentioned above.

In addition, a fail-safe means with two springs, for example, can be provided as an embodiment of a similar fail-safe function so that if, in spite of the hydraulic system being normal, an electrical fault (short-circuiting or wire disconnections) occurs in the electronically controlled throttle, the throttle can be set to the required valve angle. This valve angle should be controlled by setting the above-mentioned two springs so that the engine speed of the vehicle is higher than its idling speed and so that the vehicle can be started. The oil pressure within either starting clutch 3 or wet multi-disc clutch 38 should also be controlled to ensure that the engine speed of the vehicle is higher than its idling speed and that the vehicle can be started.

In this way, the fail-safe means bestowed on the clutch or electronically controlled throttle enables the implementation of a limp-home function including the start of the vehicle, even in the event of hydraulic system trouble or electrical trouble.

Figure 4:
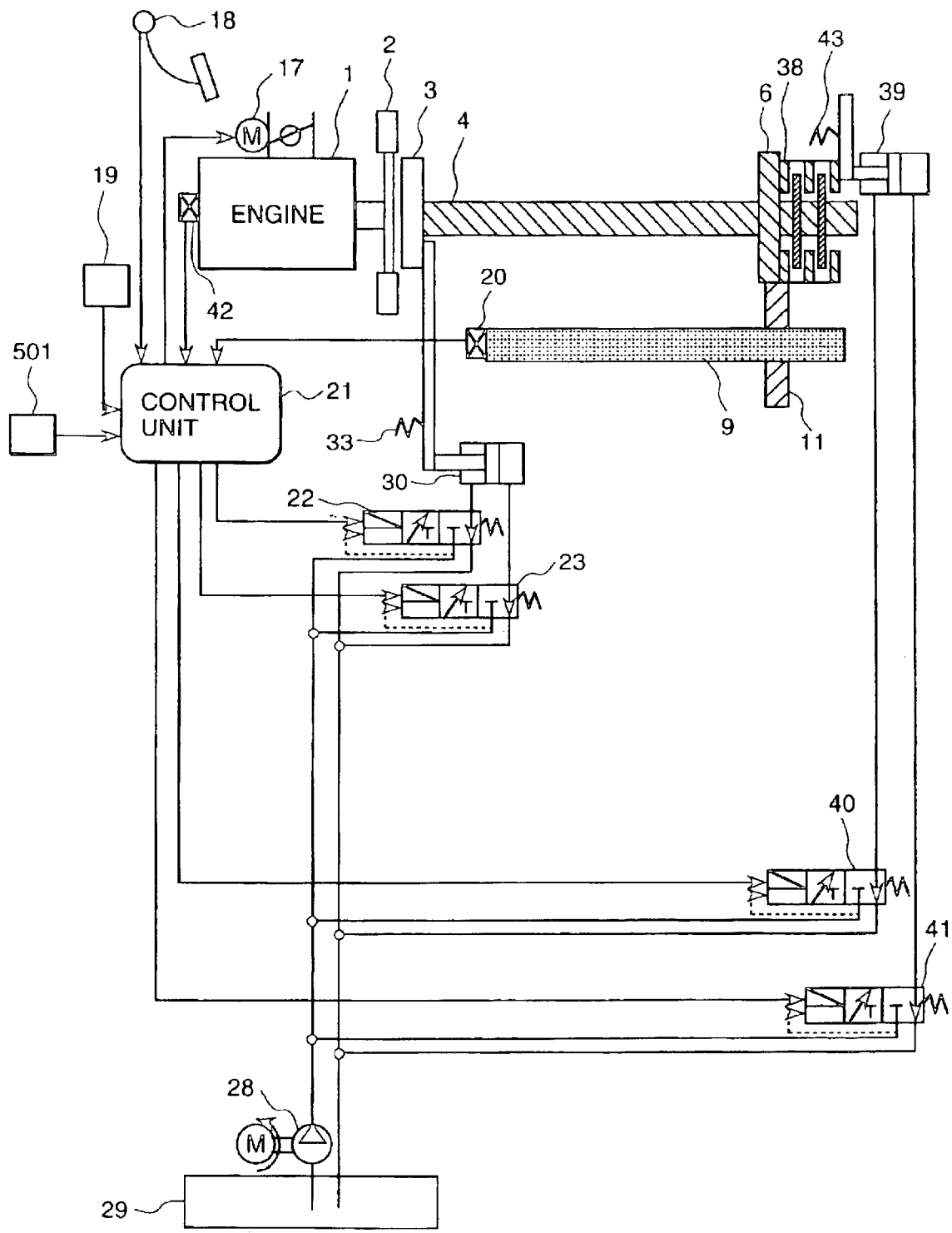
FIG. 4 shows the total configuration of an automobile power transmission system which forms still another embodiment of the present invention.

Still another embodiment of the invention is shown in FIG. 4, which, as with FIG. 3, is a total block diagram of an automobile-mounted gear-type actuator-driven automatic power transmission system whose input shaft 4 has a means for connecting a third-speed gear train to the output shaft 9 of the transmission via wet multi-disc clutch 38. This transmission system is the same as that of FIG. 3 in terms of basic construction. In FIG. 4, driving gears and driven gears other than the third-speed gear train, claw clutches related to these driving and driven gears, and solenoid-operated selector valves acting on the claw clutches are omitted. The transmission system also has a vehicle front clearance detection means 501 (for example, a millimeter wave radar or a vehicular camera) for detecting the clearance from the vehicle running in front of the own vehicle. The clearance from the vehicle running in front is measured using the signal that has been detected by said vehicle front clearance detection means, and the own vehicle is controlled to ensure that a constant clearance is maintained. The program for calculating said clearance can also be contained in said vehicle front clearance detection means 501 so that the vehicle front clearance is calculated inside the vehicle front clearance detection means.

During vehicle front clearance control in such system as set forth above, there may be a need to start the vehicle slowly by driving forward through only a very short distance from, for example, 1 to 2 meters for reduced vehicle front clearance. Since said starting clutch has a large torque capacity, high control resolution deteriorates control performance and makes it difficult to transmit a subtle engine torque. In order to avoid this problem, said starting clutch 3 low in control performance is directly connected in the embodiment shown in FIG. 4, and said wet multi-disc clutch 38 slips under its halfway engaged status to generate the driving shaft torque required for the start of the vehicle. Compared with said starting clutch 3, said wet multi-disc clutch 38 is small in torque capacity and high in control performance. The subtle torque to be transmitted is also controllable since a very linear relationship is established between the clutch engaging force and the clutch torque transmitted.

Such configuration and control technique as described above enable highly accurate torque control and hence, comfortable driving, during the start of the vehicle under vehicle front clearance control in the case of, for example, a short distance.

Figure 5:
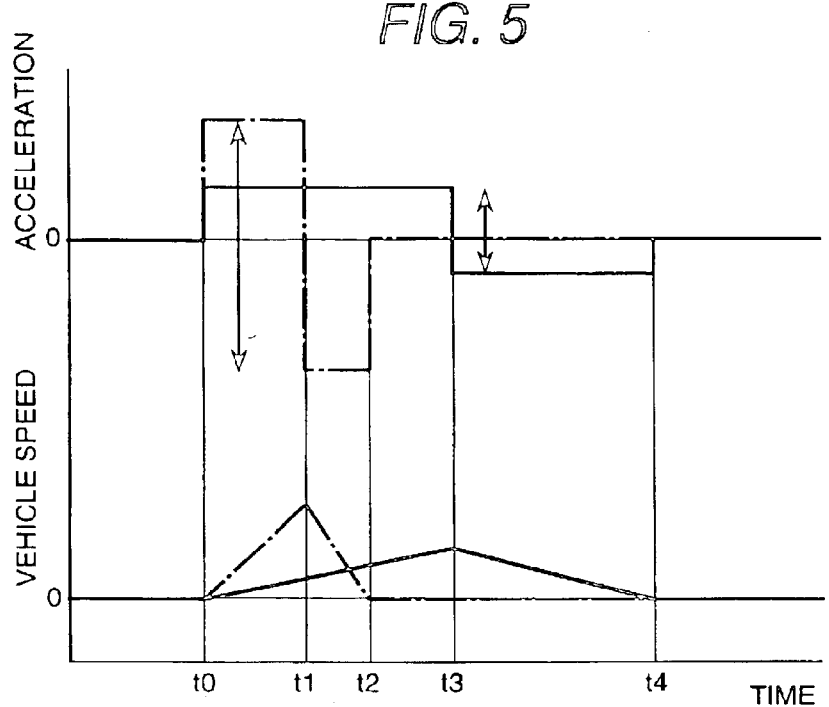
FIG. 5 shows the advantageous effects of the configuration shown in FIG. 4.

The advantageous effects of the embodiment shown in FIG. 4 are shown in FIG. 5, in which the single dashed line represents start-stop characteristics based on the control of said starting clutch 3, and the solid line represents start-stop characteristics based on the control of said wet multi-disc clutch 38. Both clutches are intended to stop the vehicle at where it has moved forward through only a short distance under vehicle front clearance control. First, the vehicle under a stopped status starts at time t0. At this time, under the control of said starting clutch 3, although it is preferable that the vehicle be started slowly, the low control performance of the starting clutch causes a significant acceleration due to the transmission of an excessive torque. As a result, since an excessive deceleration is required for the vehicle to stop at the desired position, significant changes in acceleration occur within a short time as shown in FIG. 5 and give a feeling of discomfort to the driver. Under the control of said wet multi-disc clutch 38, however, a feeling of smooth acceleration during the start and acceleration of the vehicle and a feeling of smooth deceleration during the deceleration of the vehicle can be obtained and the driver can therefore drive comfortably.

Under the configuration described above, although forward driving is enabled by the limp-home function, reversing is not enabled. Therefore, a system configuration is described below that enables the vehicle to be run in both forward and reverse directions during the use of the limp-home function.

Figure 6:
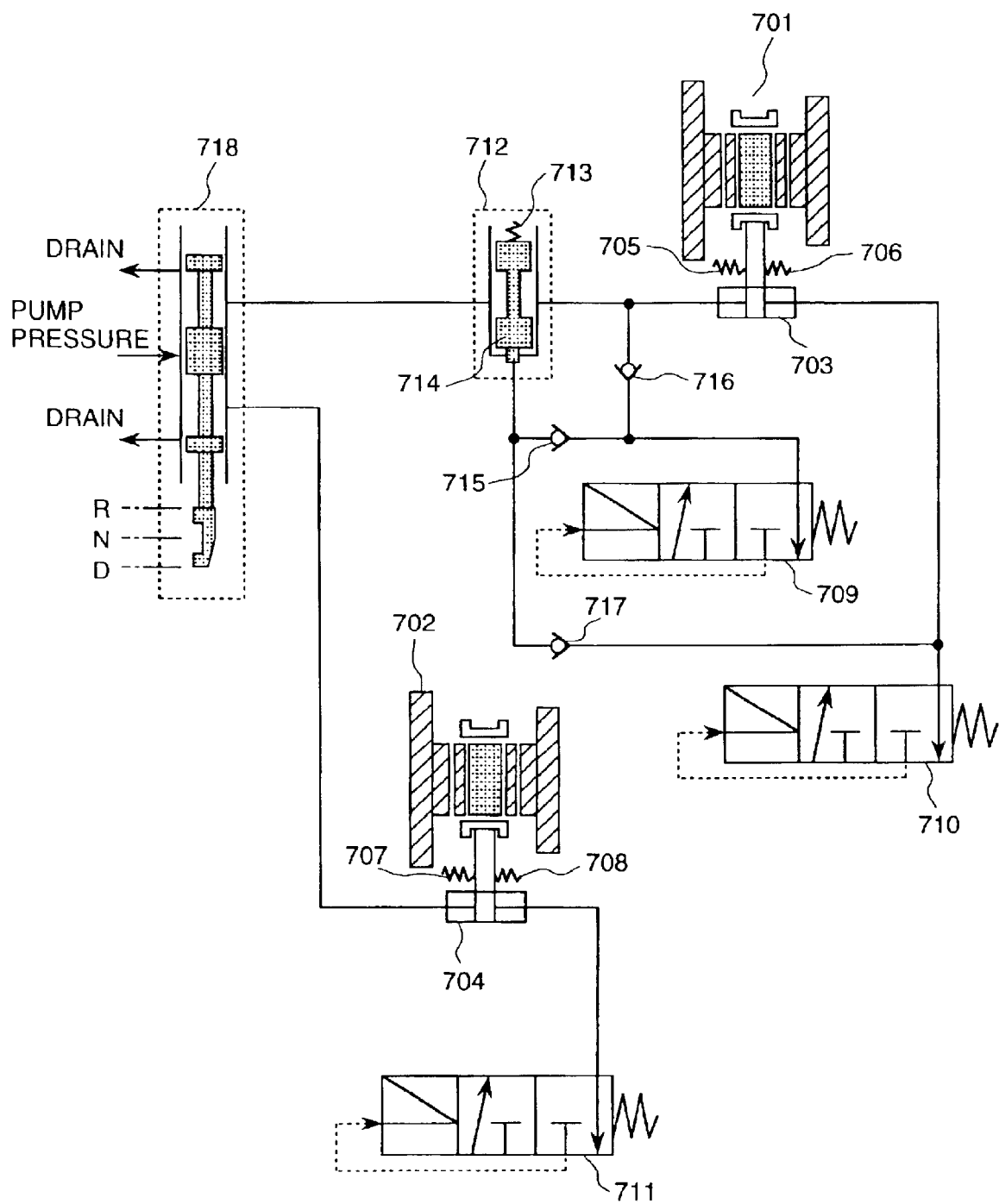
FIG. 6 shows the total configuration of an automobile power transmission system which forms still another embodiment of the present invention.

Still another embodiment of the present invention is shown in FIG. 6. This figure shows claw clutches mounted on the output shaft 9 (not shown in the figure) of the automatic transmission system shown in FIGS. 1 and 3, and the hydraulic circuit of the solenoid valves that operate these clutches.

Claw clutch 701 mounted on output shaft 9 acts on the gears whose gear ratios range from 1 to 2, and claw clutch 702 acts on the reversing gear. Said claw clutches 701 and 702 are actuated by the application of an oil pressure to actuators 703 and 704, and when an oil pressure is not occurring, claw clutches 701 and 702 are placed in neutral position by the actions of return springs 705, 706, 707, and 708. When an oil pressure is applied from both directions to actuators 703 and 704, claw clutches 701 and 702 are also placed in neutral position. This configuration includes either the claw clutches that will act on the third- and fourth-speed gears if said wet multi-disc clutch 38 is connected to the fifth-speed gear, or the claw clutches and solenoid valves that will act on the fourth- and fifth-speed gears if said wet multi-disc clutch 38 is connected to the-third-speed gear. These claw clutches, however, are not shown in the figure. ON/OFF valves are shown as an embodiment of solenoid valves 709, 710, and 711, and these valves apply an oil pressure by use of the signal that has been generated by control unit 21.

If the solenoid valves acting on said claw clutches and said wet multi-disc clutch 38 encounter trouble and fails to operate, no gears can be connected since an oil pressure is not applied. In order to prevent this from occurring, whether the solenoid valves are in trouble is judged and then the required gear is connected via an oil pressure applied for fail-safe use.

First, trouble with the solenoid valves is detected by fail-safe valve 712. Under an embodiment of the invention, fail-safe valve 712 is composed of return spring 713 and spool valve 714, and for example, if an oil pressure is occurring in either of the solenoid valves for driving the vehicle forward, said spool valve 714 will operate and a fail-safe oil pressure will not occur. In this case, whether said spool valve 714 will operate properly is designed from the shape of the oil pressure passageway, the spring constant of the return spring, and other factors. Also, the oil pressure passageway from the solenoid valves to said fail-safe valve 712 is provided with check valves 715, 716, and 717, thus preventing the oil pressure from being supplied in the opposite direction. The passageway for the fail-safe oil pressure sent from said fail-safe valve 712 is connected to a passageway reserved for the fail-safe oil pressure from the solenoid valve 709 acting on said first-speed gear, and the occurrence of a fail-safe oil pressure operates said claw clutch 701 and connects the first-speed gear. In this case, when any other gear is to be connected following the operation of said fail-safe function, the passageway for the fail-safe oil pressure sent from said fail-safe valve 712 needs to be connected to the passageway of the solenoid valve acting on the gear connected.

Said fail-safe oil pressure is generated by manual valve 718 which uses the delivery pressure of said pump 28 as the base oil pressure to interlock with a forward/reverse range select lever (not shown in the figure) provided at the driver's seat. The selection of range N (neutral) activates said manual valve 718 to shut off the base oil pressure, thus generating no fail-safe oil pressure. The selection of range D (drive) activates said manual valve 718 to supply the base oil pressure to said fail-safe valve. The selection of range R (reverse) activates said manual valve 718 to supply the base oil pressure directly to actuator 704 of claw clutch 702. The composition of such a hydraulic circuit enables a limp-home function to be implemented and the driver to run the vehicle both forward and in reverse, even if a solenoid valve failure occurs.

Figure 7:
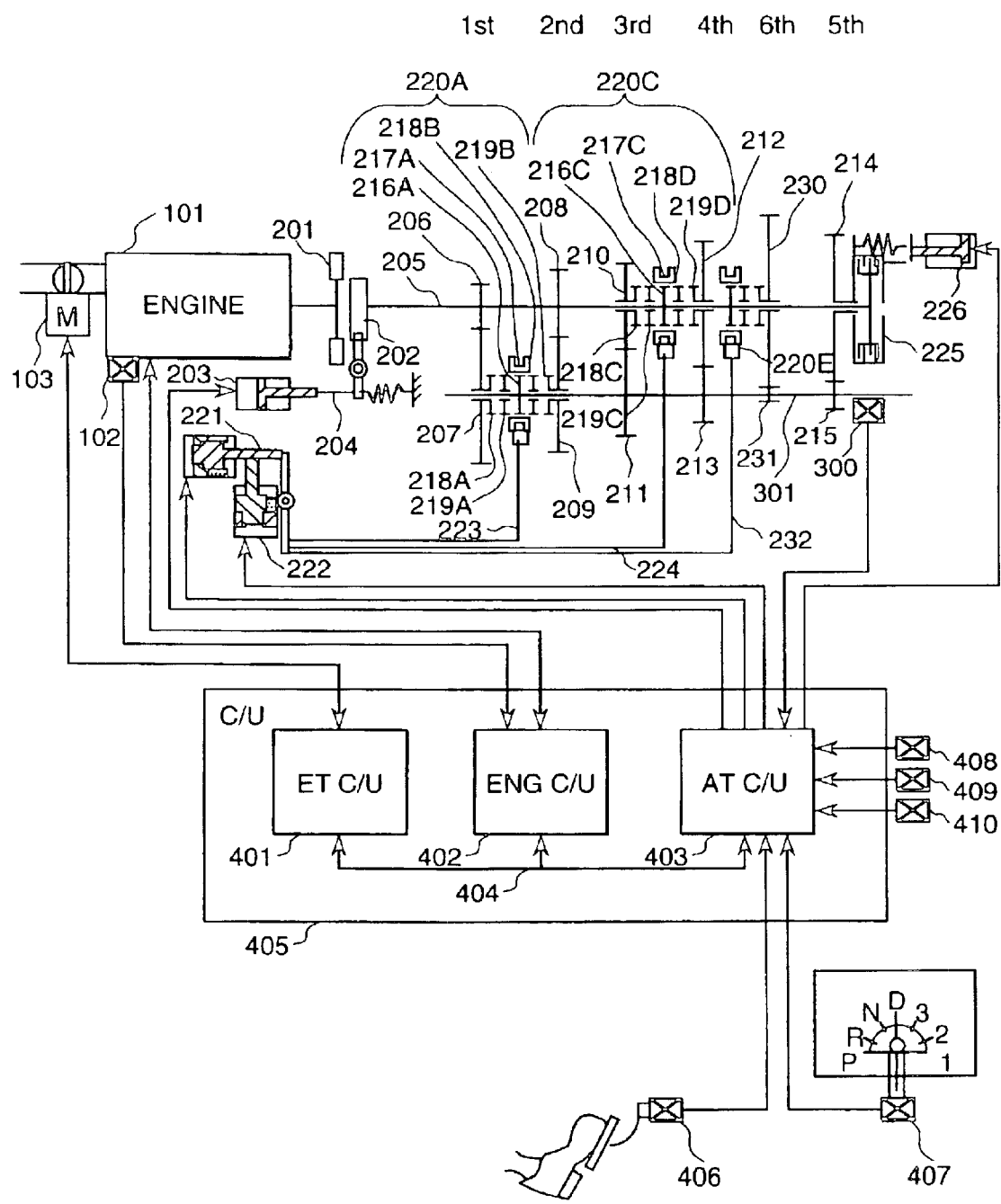
FIG. 7 shows the total configuration of an automobile power transmission system which forms still another embodiment of the present invention.

An example of a detailed automobile total configuration using an automobile control system based on this embodiment is described below using FIG. 7. In the example of FIG. 7, the engine is used as a power generator, and the gear-type transmission is used as a power transmission. Control unit (C/U) 405 is further formed with an electronically controlled throttle control unit (ET C/U) 401, which controls electronically controlled throttle 103, an engine control unit (ENG C/U) 402, which controls engine 101, and an automatic transmission control unit (AT C/U) 403, which controls the transmission. Engine 101 has the electronically controlled throttle 103 for adjusting the engine torque, and an engine speed sensor 102 for detecting the engine speed. Engine 101 is controlled by engine control unit (ENG C/U) 402. Electronically controlled throttle 103 is controlled by electronically controlled throttle control unit (ET C/U) 401. The gear-type transmission comprises flywheel 201, starting clutch 202, starting clutch actuator 203, wire 204, input shaft 205, output shaft 301, gears 206, 207, 208, 209, 210, 211, 212, 213, 214, 215, 230, and 231, dog clutch 220A for first-speed and second-speed gear use, dog clutch 220C for third-speed and fourth-speed gear use, dog clutch 220E for sixth-speed and reversing gear use, shift actuator 221, select actuator 222, shift forks 223, 224, and 232, shifting clutch 225, shifting clutch actuator 226, and output shaft speed sensor 300. Dog clutch 220C for the third and fourth gear speeds further comprises clutch hub 216C, sleeve 217C, synchronizer rings 218C and 218D, and gear splines 219C and 219D. Although not shown in the figure, dog clutch 220E for the sixth-speed gear and reversing gear also has the same configuration as that of dog clutch 220C. Actuators 203, 221, 222, and 226, which form the gear-type transmission, are controlled by automatic transmission control unit (AT C/U) 403 using an oil pressure or a motor. The engine torque from engine 101 is transmitted to the input shaft 205 of the gear-type transmission via flywheel 201 and starting clutch 202, then transmitted to output shaft 301 via either gear 206, 207, 208, 209, 210, 211, 212, 213, 214, or 215, and finally, transmitted to tires to operate the automobile. The starting clutch 3 for transmitting the engine torque to the input shaft 205 of the gear-type transmission is engaged/disengaged by the starting clutch actuator 203 and controls the transmission ratio of the engine torque. During driving at any gear speed from the first gear speed to the six gear speed, except at the fifth gear speed, either gear 210 or 212, both of which can be rotated with respect to input shaft 205, or gear 207 or 209, both of which can be rotated with respect to output shaft 301, is selected by moving the sleeve 217A or 217C of claw clutch (for example, dog clutch) 220A or 220C via shift fork 223 or 224, and then engaging clutch hub 216A or 216C and gear spline 219A, 219B, 219C, or 219D. Shift forks 223 and 224 are driven by shift actuator 221 and select actuator 222. Synchronizer rings 218A, 218B, 218C, and 218D are provided to ensure that at this time, clutch hubs 216A and 216C synchronize with gear splines 219A, 219B, 219C, and 219D. At the first gear speed, the driving shaft torque of input shaft 205 is transmitted to output shaft 301 via gear 206, gear 207, and clutch hub 216A, in that order. Gear 207 and clutch hub 216A are connected via sleeve 217A. At the third gear speed, the driving shaft torque of input shaft 205 is transmitted to output shaft 301 via clutch hub 216C, gear 210, and gear 211, in that order. Gear 210 and clutch hub 216C are connected via sleeve 217C. At the fourth gear speed, the driving shaft torque of input shaft 205 is transmitted to output shaft 301 via clutch hub 216C, gear 212, and gear 213, in that order. Gear 212 and clutch hub 216C are connected via sleeve 217C. As can be seen from this, dog clutches 220A and 220C are provided for each gear speed from the first gear speed to the sixth gear speed, except for the fifth gear speed. During driving, one gear is always engaged by dog clutch 220A or 220C, and all other gears are disengaged. Shifting to the fifth gear speed is accomplished by engaging input shaft 205 and gear 214 by means of shifting clutch 225. Shifting clutch 225 is driven by shifting clutch actuator 226. During a gear shift, shifting clutch 225 is controlled and thus the torque to be transmitted is controlled to prevent the engine speed from decreasing or increasing abruptly during the gear shift. The gear ratio is, for example, 3.545 for the first gear speed, 2.556 for the second gear speed, 2.111 for the third gear speed, 1.448 for the fourth gear speed, 1.088 for the fifth gear speed, or 0.825 for the sixth gear speed.

AT C/U 403 receives signals from the various sensors of the automobile, such as accelerator pedal sensor 406 for detecting the stepping-on stroke of the accelerator pedal, inhibitor switch 407 for detecting the position of the shift lever, output shaft speed sensor 300 for detecting the rotational speed of the output shaft, mode selector switch 408 for selecting an automatic shifting mode or a manual shifting mode, incrementing switch 409 for incrementing the shifting stage by one in manual shifting mode, and decrementing switch 410 for decrementing the shifting stage by one in manual shifting mode. Also, AT C/U 403 is connected to ENG C/U 402 and ET C/U 401 via the communications line 404 of, for example, a control area network (CAN). AT C/U 403 judges the operational status of the automobile from acquired signals and conducts optimal control of the starting clutch status and the gear position. During driving with a fixed shifting stage and during shifting, starting clutch 202 provides engagement control. During shifting, AT C/U 403 also controls electronically controlled throttle 103 via ET C/U 401 to prevent engine 101 from revolving abruptly at too high a speed. In addition, AT C/U 403 controls electronically controlled throttle 103 and shifting clutch 225 to ensure that the torque transmitted immediately before a shift is performed will change smoothly to the torque transmitted immediately after the gear shift. Furthermore, ignition timing correction data is sent from AT C/U 403 to ENG C/U 402 so as to control ignition timing. The starting clutch is engaged during driving with a fixed shifting stage and during shifting. It is possible by providing multiple shifting stages to drive in an operating region of high engine combustion efficiency and to improve fuel consumption. Also, the sixth-speed gears 230 and 231 are used for high-speed driving. This allocation of gears, compared with the use of the fifth-speed gears 214 and 215 as the top gear speed stage, reduces the frequency of use of shifting clutch 225, makes the shifting clutch less prone to time-varying changes in characteristics, and improves the durability of the clutch. In addition, since the use of frequency of the oil pressure for driving the shifting clutch 225 is reduced, this also reduces the amount of energy required for the creation of the oil pressure and improves fuel consumption. Furthermore, since engaging the shifting clutch 225 to drive at the fifth gear speed becomes unnecessary by making the gear ratios of the fifth gear and the sixth gear equal, fuel consumption improves similarly. Hence, it is advisable to make the gear ratios of the fifth and sixth gears equal.

Figure 8:
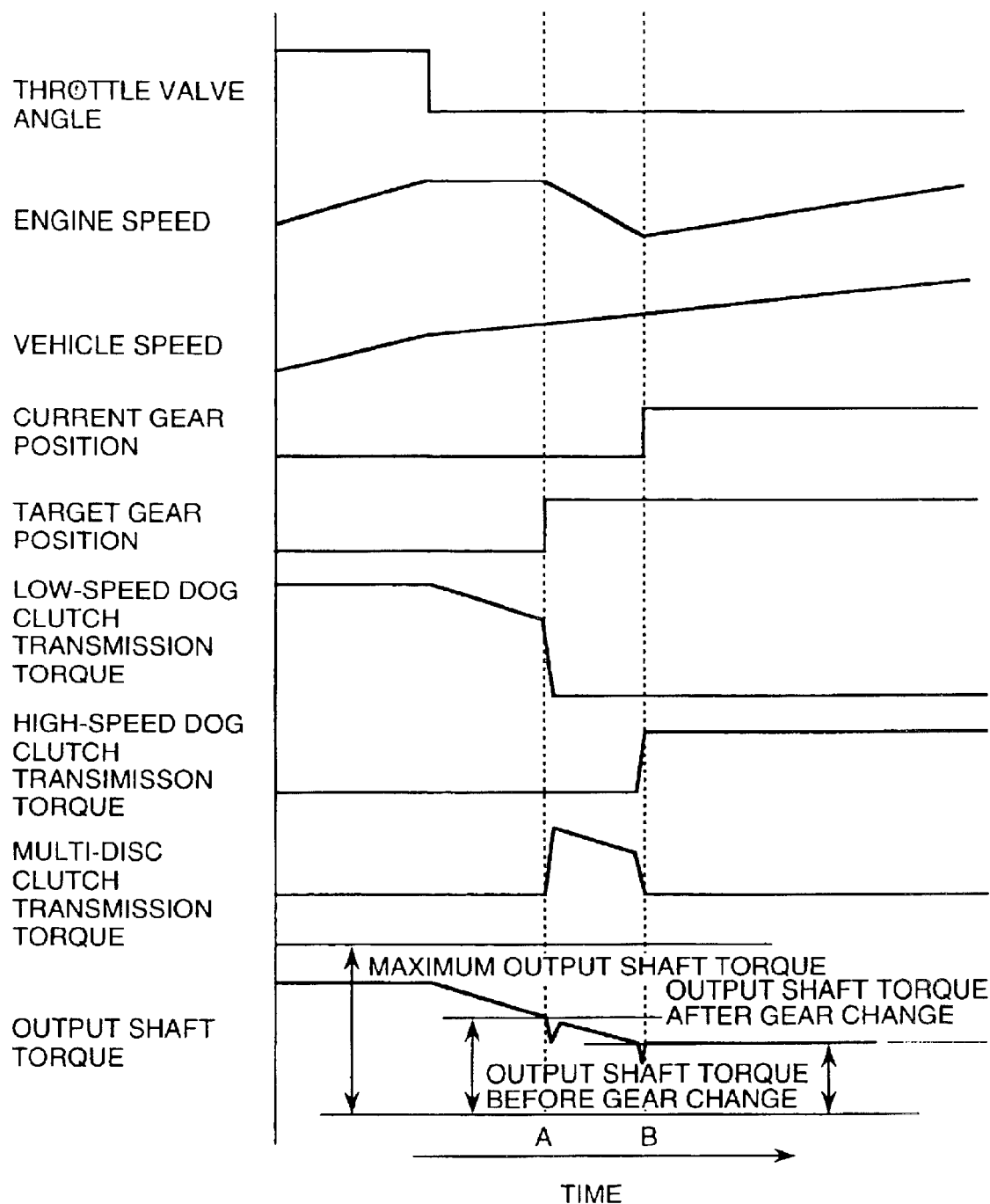
FIG. 8 shows time-varying changes in the characteristics of an automobile power transmission system which forms an embodiment of the present invention.

A timing chart of an up-shift is shown as FIG. 8. The throttle valve angle is initially set to a high value and then remains fixed at a low value. The output shaft torque also changes according to the particular angle of the throttle valve. When the vehicle speed increases and predetermined shifting conditions are satisfied, the target gear position will change at time A and shifting will be started. During a shift, the dog clutch at the low-speed gear side is disengaged first. At this time, the plunging load on the multi-disc clutch is increased. This plunging load is controlled to ensure that the output torque generated before the shift is performed will change smoothly to the output torque generated after the shift. When the engine speed synchronizes at time B, the dog clutch at the high-speed gear side will be disengaged and thus the multi-disc clutch will also be disengaged to complete the shift. In this way, an up-shift is usually conducted when an output shaft torque lower than its maximum value is occurring. Therefore, since a multi-disc clutch capable of generating the maximum output shaft torque does not always need to be provided, it is advisable to provide a multi-disc clutch capable of generating the output shaft torque required before a shift is performed. The output shaft torque required before a shift is performed refers to the output shaft torque generated before the currently engaged dog clutch is disengaged in accordance with a disengagement command. If any decreases in engine speed during a shift are permitted up to the output shaft torque existing after the shift, it is also advisable to provide a multi-disc clutch capable of generating the output shaft torque required after the shift has been performed. The output shaft torque required after the shift has been performed refers to the output shaft torque generated after the currently disengaged dog clutch has been fully engaged in accordance with an engagement command. If a multi-disc clutch is provided that has a torque capacity lower than the maximum output shaft torque, fuel consumption will improve since the body of the transmission will decrease in weight. Also, since the torque characteristics with respect to the oil pressure will be smoother, controllability will increase and shocks associated with shifting will be more suppressed.

In an automatic transmission system having a plurality of torque transmission means between the input shaft and output shaft of the gear-type transmission described in the present invention, wherein the transmission system uses a multi-disc clutch as one such torque transmission means for a specific shifting stage and claw clutches as torque transmission means for all other shifting stages and controls said multi-disc clutch during shifting from one shifting stage to another shifting stage, there may occur the problem that any fluctuations in the operation of the actuator for driving the multi-disc clutch result in trouble with the transmission. For example, during transmission control from the first gear speed to the second gear speed (or vice versa) by the system shown in FIG. 1, when the multi-disc clutch for the fifth-speed gear is controlled with the dog clutch engaged with the first-speed gear, if the oil pressure for driving the multi-disc clutch fluctuates and the clutch torque increases above the required value, the first-speed gear and the fifth-speed gear will be engaged at the same time and trouble may occur in the transmission system. In order to solve this problem, a unit for detecting the status of said multi-disc clutch is provided in the automatic transmission system having a plurality of torque transmission means between the input shaft and output shaft of the gear-type transmission described in the present invention, wherein the transmission system uses a multi-disc clutch as one such torque transmission means for a specific shifting stage, and claw clutches as torque transmission means for all other shifting stages, and controls the multi-disc clutch during shifting from one shifting stage to another shifting stage. This embodiment of the invention is described in further detail below using figures. FIG. 9 is a schematic block diagram of a hydraulic actuator provided with an oil pressure switch as the unit for detecting the status of the multi-disc clutch shown in FIG. 1. In FIG. 9, numerals 1001 and 1002 denote a hydraulic cylinder and a piston, respectively. The dotted-line portion denoted as numeral 1003, is the oil pressure switch, and the portion denoted as numeral 1004, is the multi-disc clutch. Numeral 1005 denotes a graph of the oil pressure status within cylinder ①, and numeral 1006 denotes a graph of control unit input signal ②. First, when the hydraulic cylinder is filled with an oil and the oil pressure inside the hydraulic cylinder increases, this pressure will move piston 1002 in the direction of the arrow. Multi-disc clutch 1004 will be pressed according to the particular operation of piston 1002. Oil pressure switch 3 is located inside the hydraulic cylinder to detect the status of the multi-disc clutch. Oil pressure switch 3 is normally on, and it will turn off when the oil pressure inside the hydraulic cylinder increases above the required value. The adoption of such a configuration ensures that as shown by graph 1005, until the oil pressure inside the hydraulic cylinder exceeds the required value, control unit input signal 1006 is maintained in a 'Low' status and once the oil pressure inside the hydraulic cylinder has exceeded the required value, signal 1006 enters a 'High' status. The use of this oil pressure switch enables the detection of the multi-disc clutch status (plunging load and slipping status).

FIG. 10 is a timing chart of up-shift transmission control using the oil pressure switch shown in FIG. 9.

In FIG. 10, numeral (1) denotes the throttle valve angle, (2) denotes the engine speed, (3) denotes the vehicle speed, (4) denotes the current gear position, (5) denotes the target gear position, (6) denotes the dog clutch located at the low-speed gear side, (7) denotes the transmission torque of the dog clutch located at the high-speed gear side, (8) denotes a multi-disc clutch oil pressure command, (9) denotes an actual multi-disc clutch oil pressure, and (10) denotes the transmission torque of the multi-disc clutch.

The solid lines in FIG. 10 represent the ideal transmission control timing of an up-shift in the automatic transmission system shown in FIG. 1. The engine speed and the vehicle speed increase with the throttle valve angle remaining fixed, and when the shifting conditions intended by the driver or prestored within the control unit are satisfied, the target gear position will change at time A and the shift will be started. When the shift is performed, the dog clutch at the low-speed gear side is disengaged first and at this time, the plunging load on the multi-disc clutch is increased. This plunging load must be controlled to ensure that the output torque generated before the shift is performed will change smoothly to the output torque generated after the shift. The plunging load on the multi-disc clutch is determined by the internal oil pressure of the hydraulic cylinder which drives the clutch. In actual operation, since the hydraulic system must be filled up with an oil to enhance the response characteristics and stability of the hydraulic system, fill-up control based on an oil pressure command value is conducted at the initial phase of transmission control as shown by graph (8). However, since the response of the hydraulic system is not constant, the rise time, the deviation from the command value, and other factors may significantly change according to the particular status of the oil, performance of the actuator, the amount of oil left in the hydraulic system, and other conditions. Therefore, if, as shown by dotted line (9), the rise time of hydraulic system response is earlier than an ideal time [denoted by dotted line (9)] and a high oil pressure is applied, the transmission torque [denoted by dotted line (10)] of the multi-disc clutch will increase above an ideal torque [denoted by solid line (10)] and a torque greater than the value actually required will be transferred from the gear of the shifting stage which is using the multi-disc clutch. Consequently, the gear at the low-speed gear side and the gear using the multi-disc clutch will be simultaneously engaged and the amounts of torque transmitted from both gears will not be accurately controlled, with the result that the transmission system may get damaged. To solve this problem, it is necessary that if the oil pressure for driving the multi-disc clutch has increased above the appropriate value, the disengagement of the dog clutch located at the low-speed gear side should be accelerated by reducing the engine torque. For example, if the actual oil pressure of the multi-disc clutch arrives at the value marked ① with an arrow in FIG. 10, the input signal from the oil pressure switch to the controller will take a 'High' status first. Next, as shown by dotted line (1), the throttle valve will be temporarily closed according to the particular signal level of the oil pressure switch in order to reduce the engine torque. Reduction in the engine torque by means of the throttle in this way will accelerate the reduction in the transmission torque of the dog clutch at the low-speed gear side as shown by dotted line (6), with the result that since the dog clutch at the low-speed gear side will be disengaged according to the particular reduction in the transmission torque, damage to the transmission system can be avoided. Reduction in the engine torque will also reduce the load on the transmission system since the amounts of torque transmitted from the gear at the low-speed gear side and the gear of the shifting stage using the multi-disc clutch will decrease. It is likewise advisable to reduce the engine torque by controlling ignition timing.

Figure 11:
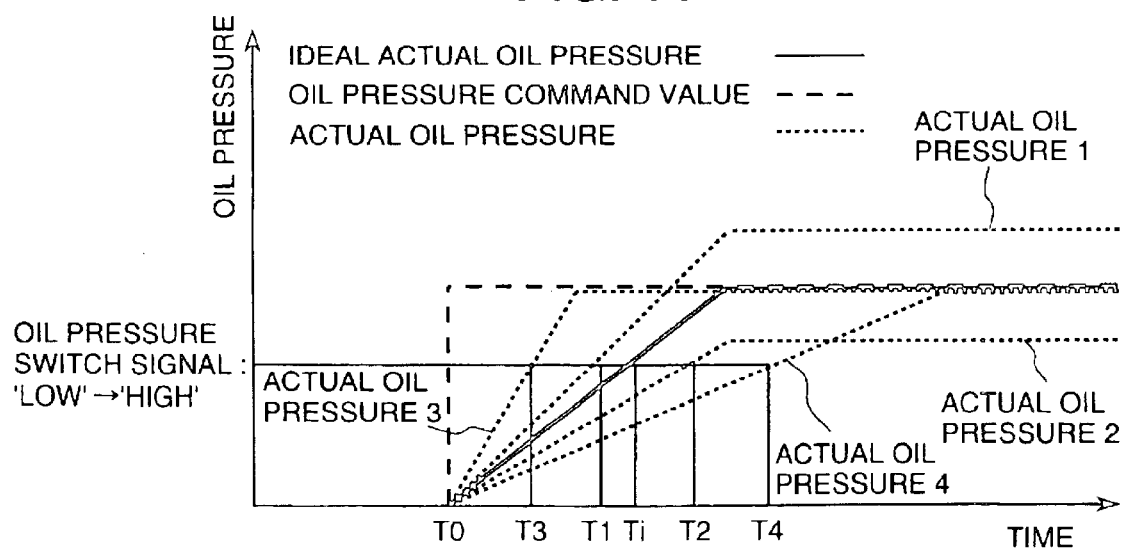
FIG. 11 shows time-varying changes in the oil pressure of an automobile power transmission system which forms another-embodiment of the present invention.

The time up to the issuance of a signal from the above-mentioned oil pressure switch can also be stored into memory and incorporated into oil pressure control during next transmission control onward. Changes in ideal oil pressure, in oil pressure command value, and in actual oil pressure are shown in FIG. 11, wherein as shown by its values 1 to 4, the actual oil pressure fluctuates according to factors such as the status of the oil, the status of the oil left in the hydraulic system, and the deterioration of the hydraulic system with time. For example, if an ideal actual oil pressure occurs for the oil pressure command value generated at time T0, a change in the status of the oil pressure switch signal from 'Low' to 'High' will occur at time Ti. At this time, if the actual oil pressure fluctuates as shown by its value 1, a change in the status of the oil pressure switch signal from 'Low' to 'High' will occur at time T1. The difference between these values of Ti and T1 should be stored into memory as a parameter equivalent to the particular fluctuation in oil pressure and then incorporated during next transmission control onward. For actual oil pressure 1, since the rate of increase of the oil pressure is too high, an oil pressure higher than its command value is likely to be occurring. During next transmission control onward, therefore, control based on the value of Ti−T1 needs to be conducted so that the oil pressure command value is reduced below the oil pressure control value obtained before memory storage. Similarly for actual oil pressure 2, since the rate of increase of the oil pressure is too low, an oil pressure lower than its command value is likely to be occurring. During next transmission control onward, therefore, control based on a value of Ti–T2 needs to be conducted so that the oil pressure command value is increased above the oil pressure control value obtained before memory storage. Also, as shown by actual oil pressure 3, although the oil pressure follows the oil pressure command value, the rate of increase of the oil pressure may be too high. In such a case, therefore, control based on a value of Ti–T3 also needs to be conducted during next transmission control onward so that the rate of increase of the oil pressure is reduced. Similarly for actual oil pressure 4, since the rate of increase of the oil pressure is too low, this rate of increase needs to be increased after a value of Ti–T4 has been stored into memory. Such learning control enables more accurate control of the actuator oil pressure and, hence, the prevention of transmission system damage.

Next, how to troubleshoot for the oil pressure switch shown in FIG. 9 is described below using FIGS. 12 and 13.

As shown in FIG. 12, if wire disconnections occur at specific portions (say, x-marked portions 1007 and 1008) in the circuit of oil pressure switch 1003, since a 'High' signal will always be supplied to the control unit to make it impossible to judge whether the oil pressure switch-has operated, damage to the transmission system must be avoided by inhibiting the control of the multi-disc clutch. The oil pressure switch, therefore, requires troubleshooting based on FIG. 13.

Figure 13:
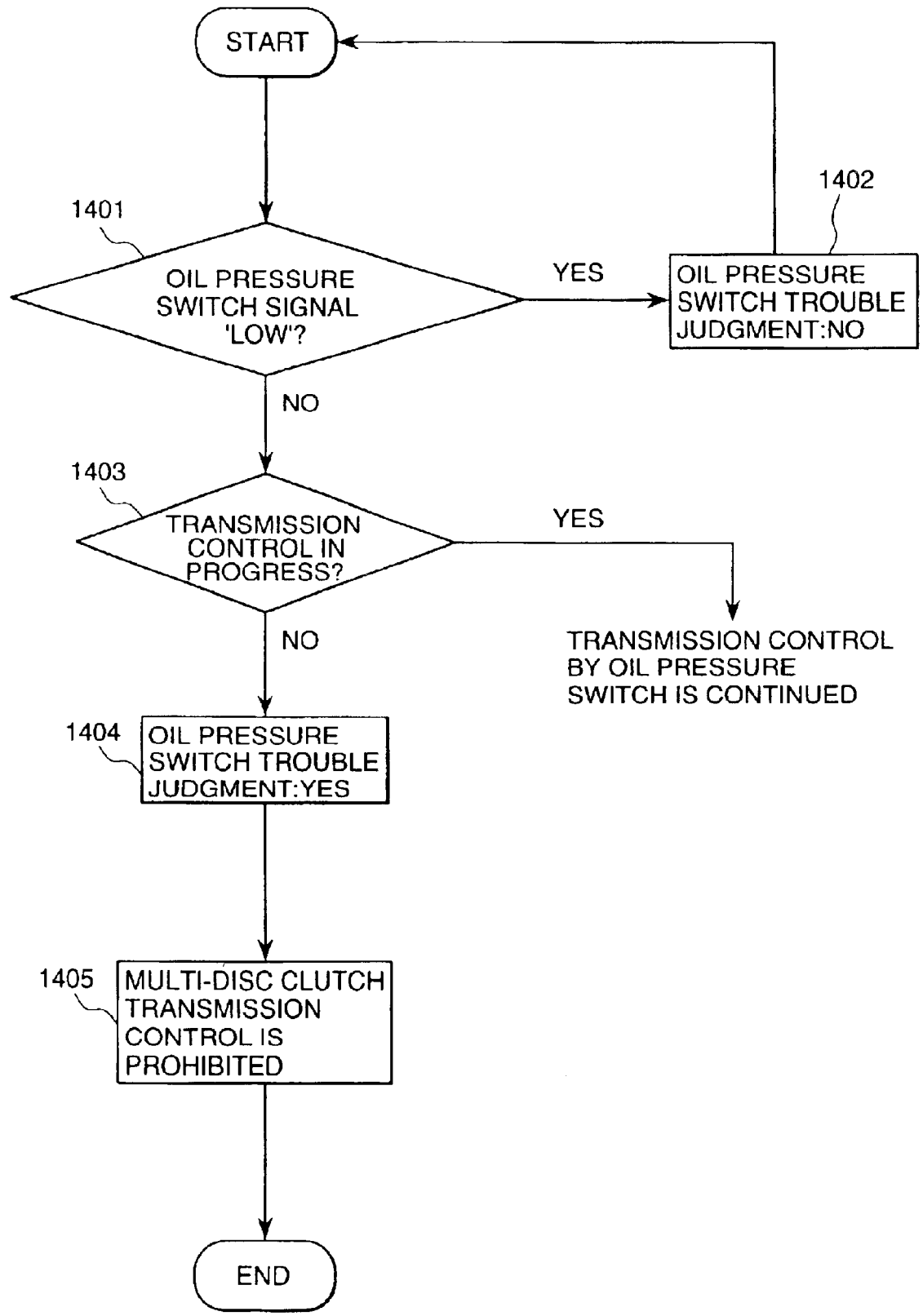
FIG. 13 shows a flow chart of an automobile power transmission system which forms an embodiment of the present invention.

FIG. 13 is a flowchart of oil pressure switch troubleshooting. First, process 1401 is performed to judge whether the input signal from the oil pressure switch to the control unit is in a 'Low' status. If the signal status is judged to be 'Low' in process 1401, control will proceed to process 1402, in which the oil pressure switch will then be judged not to be in trouble and control will be returned to the beginning of the flowchart. If the signal status is judged not to be 'Low' in process 1401, control will skip to process 1403. In process 1403, whether transmission control is in progress will be judged and if transmission control is judged to be in progress, regular transmission control using the oil pressure switch will be continued. If, in process 1403, transmission control is judged not to be in progress, control will proceed to process 1404, in which, if the signal status is not 'Low' in spite of transmission control not being in progress, since wire disconnections may be occurring in the oil pressure switch circuit, it will be judged in process 1404 that the oil pressure switch is in trouble, and then control will proceed to process 1405. Since the control of the multi-disc clutch during a shift with the oil pressure switch in trouble may damage the transmission system, multi-disc clutch control during a shift will be inhibited in process 1405 and troubleshooting will be terminated.

Figure 14:
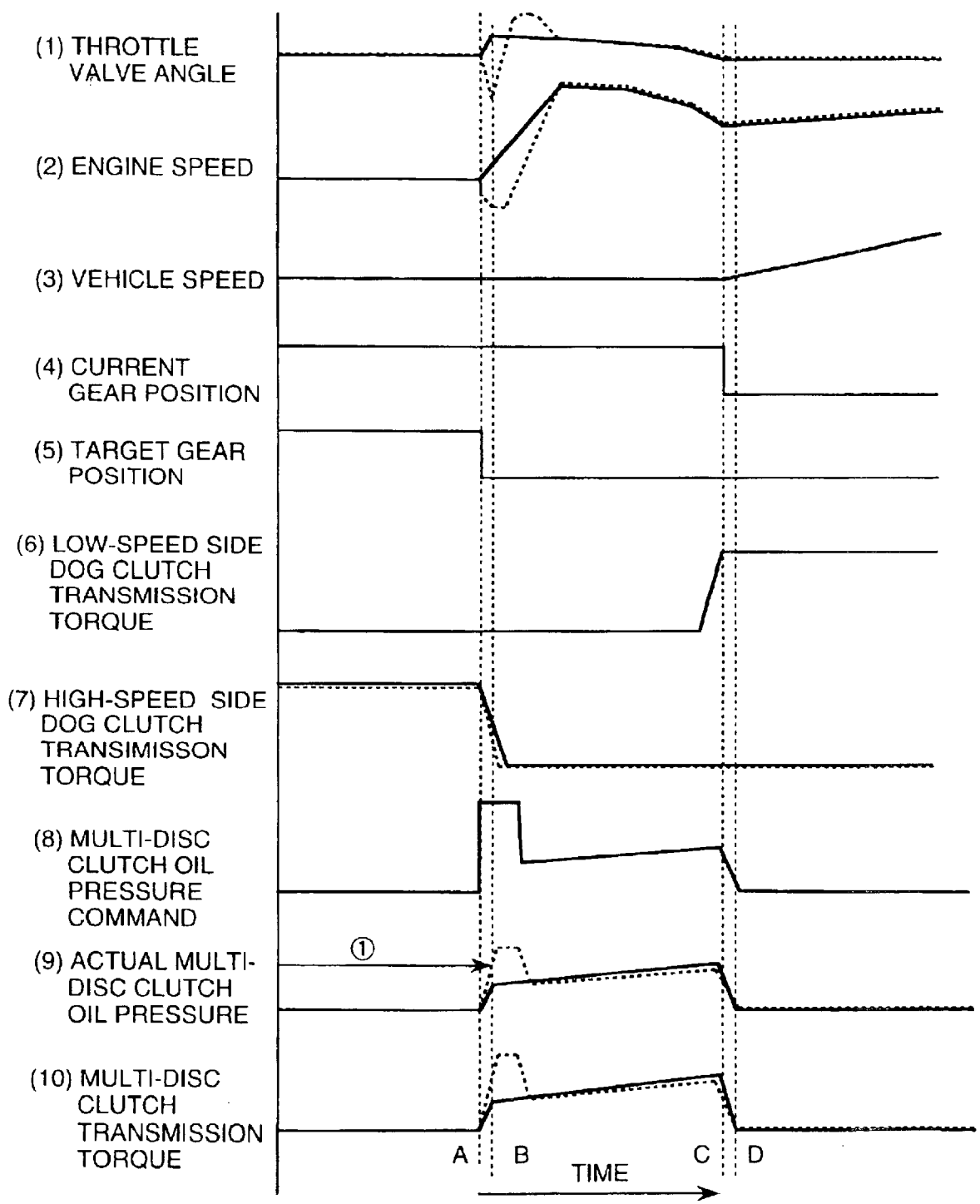
FIG. 14 shows time-varying changes in the characteristics of an automobile power transmission system which forms still another embodiment of the present invention.

FIG. 14 is a timing chart of down-shift transmission control using the oil pressure switch shown in FIG. 9.

As with FIG. 10, FIG. 14 denotes the throttle valve angle as (1), the engine speed as (2), the current gear position as (4), the target gear position as (5), the transmission torque of the dog clutch at the low-speed gear side as (6), the transmission torque of the dog clutch at the high-speed gear side as (7), a multi-disc clutch oil pressure command as (8), an actual multi-disc oil pressure as (9), and a multi-disc clutch transmission torque.

The solid lines in FIG. 14 represent the ideal down-shift transmission control timing of the automatic transmission system shown in FIG. 1. When the shifting conditions intended by the driver or prestored within the control unit are satisfied, the target gear position will change at time A and the shift will be started. When the shift is performed, the dog clutch at the high-speed gear side is disengaged first and the plunging load on the multi-disc clutch is increased. In general, since the dog clutch needs to be engaged with the low-speed gear side smoothly to accomplish a down-shift, there is a need to open the throttle valve and increase the engine speed. Also, when the multi-disc clutch is connected to a high gear (a gear small in shifting ratio), the throttle valve needs to be further opened since the engine speed is reduced by the control of the multi-disc clutch during the down-shift. As with an up-shift, the down-shift requires that during the control of the multi-disc clutch during the shift, since the response characteristics and stability of the hydraulic system should be enhanced by filling it up with an oil, fill-up control based on an oil pressure command value is conducted at the initial phase of transmission control as shown by graph (8).

However, since the response of the hydraulic system is not constant, the rise time, the deviation from the command value, and other factors may significantly change according to the particular status of the oil, performance of the actuator, the amount of oil left in the hydraulic system, and other conditions. Therefore, if, as shown by dotted line (9), the rise time of hydraulic system response is earlier than an ideal time [denoted by dotted line (9)] and a high oil pressure is applied, the transmission torque [denoted by dotted line (10)] of the multi-disc clutch will increase above an ideal torque [denoted by solid line (10)] and a torque greater than the value actually required will be transferred from the gear of the shifting stage which is using the multi-disc clutch. Consequently, the gear at the high-speed gear side and the gear using the multi-disc clutch will be simultaneously engaged and the amounts of torque transmitted from both gears will not be accurately controlled, with the result that the transmission system may get damaged. To solve this problem, it is necessary that if the oil pressure for driving the multi-disc clutch has increased above the appropriate value, the disengagement of the dog clutch located at the high-speed gear side should be accelerated by reducing the engine torque. For example, if the actual oil pressure of the multi-disc clutch arrives at the value marked ① with an arrow in FIG. 14, the oil pressure switch will be activated to generate a signal first. Next, as shown by dotted line (1), the throttle valve will be temporarily closed according to the particular signal level of the oil pressure switch in order to reduce the engine torque. Reduction in the engine torque by means of the throttle in this way will accelerate the reduction in the transmission torque of the dog clutch at the high-speed gear side as shown by dotted line (6), with the result that since the dog clutch at the high-speed gear side will be disengaged according to the particular reduction in the transmission torque, damage to the transmission system can be avoided. Reduction in the engine torque will also reduce the load on the transmission system since the amounts of torque transmitted from the gear at the high-speed gear side and the gear of the shifting stage using the multi-disc clutch will decrease. When the throttle is temporarily closed, a time lag from a temporary reduction in the engine speed to the restart of its increase will occur and the shifting time will be correspondingly prolonged. To increase the engine speed quickly in such a case, the throttle valve angle needs to be increased above the value denoted by the solid line in FIG. 14.

INDUSTRIAL AVAILABILITY

According to the present invention, it is possible to perform smooth shifts and implement comfortable driving without giving a feeling of discomfort to the passengers (including the driver), even when the shifts are performed under a high output shaft torque status. It is also possible to drive the automobile even if trouble occurs in the driving source of the actuator which drives the automatic transmission system.

What is claimed is:

1. An automatic transmission system for a vehicle having an engine, comprising:

a gear-type transmission having a plurality of gears and a plurality of claw clutches to transmit a torque between an input shaft and an output shaft of said gear-type transmission;

said gear-type transmission being operative to change transmission courses by at least one of engaging with and disengaging from said gears and said claw clutches, and to another transmission course via a torque controller operatively arranged between said input shaft and said output shaft of said gear-type transmission during a period between a first transmission course, and a second transmission course formed by said gears and said claw clutches; wherein the automatic transmission system comprising further an oil pressure switch; and a signal of said hydraulic pressure switch changes when an oil pressure for operating said torque controller increases above a required value.

2. An automatic transmission system according to claim 1, wherein in accordance with said oil pressure switch, it is judged that said oil pressure for driving said torque controller increases than a proper value, an engine torque to made to lower and a release for said claw clutch of said first transmission clutch is made to quicken.

3. An automatic transmission system according to claim 2, wherein by closing a throttle valve of said engine, said engine torque is made to lower.

4. An automatic transmission system according to claim 2, wherein by controlling an ignition time period of said engine, said engine torque is made to lower.

5. An automatic transmission system according to claim 1, wherein a time for changing said signal of said oil pressure switch from a command generation of said oil pressure is learned.

6. An automatic transmission system according to claim 1, wherein when said signal of said oil pressure switch changes under a condition different from during a gear shift control, it is judged as a failure of an oil pressure switch circuit, and a control of said torque controller is prohibited.

* * * * *